United States Patent [19]
Itabashi et al.

[11] Patent Number: 5,854,323
[45] Date of Patent: Dec. 29, 1998

[54] PIGMENT DISPERSING AGENT, COMPOSITION CONTAINING THE SAME, AND AQUEOUS PIGMENT DISPERSION

[75] Inventors: Tadashi Itabashi; Takashi Kamikubo; Katsuhiko Sawamura, all of Tokyo, Japan

[73] Assignee: Toyo Ink Manufacturing Co., Ltd., Tokyo, Japan

[21] Appl. No.: 712,452

[22] Filed: Sep. 11, 1996

[30] Foreign Application Priority Data

| Sep. 11, 1995 | [JP] | Japan | 7-232167 |
| Sep. 11, 1995 | [JP] | Japan | 7-232169 |
| Sep. 18, 1995 | [JP] | Japan | 7-238162 |
| Sep. 18, 1995 | [JP] | Japan | 7-238164 |
| Sep. 18, 1995 | [JP] | Japan | 7-238167 |
| Sep. 18, 1995 | [JP] | Japan | 7-238168 |
| Sep. 18, 1995 | [JP] | Japan | 7-238169 |

[51] Int. Cl.$^6$ ............................... C08K 5/34; C08L 39/00
[52] U.S. Cl. ............... 524/88; 524/89; 524/190; 524/357; 524/555; 524/556; 524/812; 525/355; 526/259; 526/260
[58] Field of Search ............... 524/88, 507, 555, 524/556, 812; 526/259, 260, 220; 555/355

[56] References Cited

U.S. PATENT DOCUMENTS 5,051,464  9/1991  Johnson et al. ............... 524/555
5,420,187  5/1995  Endo et al. ............... 526/259

FOREIGN PATENT DOCUMENTS 6-88042   3/1994  Japan.
6-207120  7/1994  Japan.
7-41689   2/1995  Japan.

*Primary Examiner*—Tae Voon
*Attorney, Agent, or Firm*—Knobbe, Martens, Olson & Bear, LLP

[57] ABSTRACT

The present invention provide an aqueous type pigment dispersing agent having one portion which has a high affinity with a pigment and which has at least one type of selected from the group consisting of an organic dye, anthraquinone and acridone and only at a terminal end or at both terminal ends of at least one aqueous polymer selected from an aqueous linear urethanic polymer and an aqueous linear acrylic polymer, a pigment composition using the same and a pigment dispersion. The portion having a high affinity with the pigment can be adsorbed efficiently on the surface of a pigment. At the same time, for example, a pigment, used for ink or paint can be dispersed stably due to the affinity between the polymer portion and a disperse medium to improve the adaptability in use and the quality of coating articles.

11 Claims, No Drawings

PIGMENT DISPERSING AGENT, COMPOSITION CONTAINING THE SAME, AND AQUEOUS PIGMENT DISPERSION

BACKGROUND OF THE INVENTION

1. Field of the Invention

The present invention concerns a dispersing agent for pigment particles and, more specifically, it relates to an aqueous type pigment dispersing agent for improving the adaptability for use of water based printing ink or water based paint, a pigment composition containing the same and an aqueous pigment dispersion.

2. Description of the Related Art

In recent years, aqueous systems have been adopted more and more for paint and ink along with an increasing demand, for example, for resource conservation, environmental protection improvement of operation stability and the like.

Quality required for water based paint and water based ink includes, like that in oil based paint and oil based ink, flowability, storage stability, gloss of coating film, clarity, tinting strength and the like. However, since most of pigments are remarkably inferior in the adaptability, for example, pigment dispersibility in an aqueous vehicle as compared with that of oil based pigments, no satisfactory quality can be obtained by a usual dispersing method. In view of the above, while the use of various kinds of additives, for example, aqueous type pigment dispersing resins or surface active agents have been studied, it has not yet been obtained such an effect as satisfying all the adaptability described above and comparable with existent oil based paint or oil based ink of high quality.

Japanese Patent Application Laid-Open (JP-A) No. 7-41689 discloses a polymer type dispersing agent in which an organic dye is coupled with a polymer and describes that this is a dispersing agent effective in the aqueous system. It is considered that adsorption of the polymeric dispersing agent to pigment particles is promoted by interaction between the organic dye contained in the polymer type dispersing agent and the pigment particle, to improve the dispersibility. However, in the polymeric dispersing agent described in this patent literature, the organic dye and the polymer are coupled by using functional groups present at random in the polymer. According to this method, since the organic dye is introduced at random into the polymer, affinity between the polymer portion and a disperse medium is weakened, it is difficult to ensure an adsorption layer required for stabilization of dispersion or, since the affinity to a disperse medium is decreased as the amount of the organic dye introduced into the polymer is increased, an adsorption layer required for the stabilization of dispersion can not be ensured.

Japanese Patent Application Laid-Open (JP-A) No. 6-207120 describes that a polymer type dispersing agent in which anthraquinone or the like is introduced to a polymer terminal end is satisfactory from the view point of versatility use. However, according to this patent literature, in such a polymer type dispersing agent, anthraquinone and is linked to a polymer formed by polymerizing a monomer by use of a diazotization product formed by diazotizing, for example, a derivative of anthraquinone having an aromatic amino group as a polymerization initiator. In this method, since anthraquione containing the aromatic amino group is slightly soluble and it is difficult to obtain a concentration which is necessary as the polymerization initiator, the method involves a problem in view of productivity and the like.

Japanese Patent Application Laid-Open (JP-A) No. 6-88042 discloses that a polymer type dispersing agent which is formed by introducing an organic dye to a polymer terminal end shows satisfactory pigment dispersibility in an aqueous system. However, according to this patent literature, monomers are polymerized by using, as a polymerization initiator, a diazotization product formed by diazotizing an organic dye derivative having an aromatic amino group for the purpose of coupling the organic dye with the polymer. In this method, the organic dye derivative containing the aromatic amino group is slightly soluble, accordingly, it is difficult to obtain a concentration which is necessary as the polymerization initiator, so that the method involves a problem in view of productivity.

SUMMARY OF THE INVENTION

An object of the present invention is to overcome the foregoing various drawbacks and to provide an aqueous type pigment dispersing agent capable of dispersing a pigment satisfactorily in an aqueous system, and capable of being produced with an industrial advantage, a pigment composition containing the same and an aqueous pigment dispersion.

That is, in accordance with a first aspect of the present invention, an aqueous type pigment dispersing agent according to the present invention has a portion which has a high affinity with a pigment and which has at least one type selected from the group consisting of an organic dye, anthraquinone and acridone only at a terminal end of at least one aqueous polymer selected from the group consisting of an aqueous linear urethanic polymer and an aqueous linear acrylic polymer.

In accordance with a second aspect of the present invention, an aqueous type pigment dispersing agent comprises the dispersing agent as defined in the first aspect, wherein the aqueous linear urethanic polymer has at least one group selected from the group consisting of primary amino group, secondary amino group, hydroxy group and isocyanate group only at a terminal end of the polymer, the portion a having high affinity with the pigment has at least one reactive group selected from the group consisting of —COCl, —SO$_2$Cl, —CH$_2$Cl, —CH$_2$NHCOCH$_2$Cl, —COOH, —NH$_2$, —NHR (R represents an alkyl group or a substituted alkyl group) and —OH, and the group at the terminal end of the aqueous linear urethanic polymer is made to react with the reactive group in the portion having a high affinity with the pigment.

In accordance with a third aspect of the present invention, an aqueous type pigment dispersing agent comprises the dispersing agent as defined in the first aspect, wherein the aqueous linear acrylic polymer has a primary amino group and/or a secondary amino group only at a terminal end, the portion having high affinity with the pigment has at least one reactive group selected from —COCl, —SO$_2$Cl, —CH$_2$Cl and —CH$_2$NHCOCH$_2$Cl, and the primary amino group and/or the secondary amino group is reacted with the reactive group.

In accordance with a fourth aspect of the present invention, an aqueous type pigment dispersing agent comprises the dispersing agent as defined in the third aspect, wherein the aqueous linear acrylic polymer is an aqueous linear acrylic polymer formed by polymerizing a monomer having the radical polymerizable unsaturated bond by using a chain transfer agent having a primary amino group and/or a secondary amino group.

In accordance with a fifth aspect of the present invention, an aqueous type pigment dispersing agent comprises the dispersing agent as defined in the first aspect, wherein the aqueous linear acrylic polymer is an aqueous linear acrylic polymer in which the portion having a high affinity with the pigment has an —SH group and which is formed by polymerizing a monomer having a radical polymerizable unsaturated bond by using the portion having high affinity with the pigment and having the —SH group as a chain transfer agent.

In accordance with a sixth aspect of the present invention, a pigment composition comprises an aqueous pigment dispersing agent as defined in any one of first to fifth aspects, and a pigment.

In accordance with a seventh aspect of the present invention, an aqueous pigment dispersion comprises an aqueous type pigment dispersing agent as defined in any one of first to fifth aspects, a pigment, and an aqueous resin.

DETAILED DESCRIPTION OF THE INVENTION

The present invention will be explained in more details hereinafter.

Since the pigment dispersing agent according to the present invention is of such a structure that has a portion which has a high affinity with a pigment and which has at least one type selected from the group consisting of organic dye, anthraquinone and acridone only at a terminal end or both terminal ends of a polymer chain, an organic dye, anthraquinone or acridone can be efficiently adsorbed on the surface of a pigment, and the adsorption of the organic dye, anthraquinone or acridone on the pigment can be stabilized efficiently by a strong affinity between the polymer portion and a disperse medium.

Further, in accordance with the synthesis technique of the present invention, a small amount of the organic dye, anthraquinone or acridone can be introduced at a high accuracy into the dispersant by utilizing the terminal end of the polymer.

In the present invention, a portion which has a high affinity with a pigment, and which has at least one type selected from the group consisting of organic dye, anthraquinone and acridone is hereinafter collectively referred to as an organic dye or the like unless otherwise specified.

The organic dyes or the like used in the present invention include, for example, organic dyes such as phthalocyanine series, insoluble azo series, azo-lake series, anthraquinone series, acridone series, quinacridone series, dioxazine series, diketopyrrolopyrrole series, anthrapyridine series, anthanthrone series, indanthrone series, flavanthrone series, perinone series, perylene series, thioindigo series, isoindolinone series and benzimidazolone series dyes, as well as anthraquinone and acridone.

Anthraquinone or acridone differs from anthraquinone type organic dyes or acridone type organic dyes in that the former is represented by the following formula (1) or (2), while the latter has a structure represented by the following formula (3), (4) or (5) that has a dimeric or higher order structure relative to that represented by the formula (1) or (2). While anthraquinone or acridone shown by the following formula (1) or (2) is colorless or only slightly colored to pale yellow, coloration is strengthened as a monomeric structure is extended sequentially to form anthraquinone dyes or acridone organic dyes.

In a case of aqueous type pigment dispersing agent with a colorless or only slightly colored anthraquinone or acridone, since the aqueous type pigment dispersing agent is colorless or sligthly colored, the agent is highly versatile and preferred in that it does not deteriorate the hue of a pigment used when the agent is applied to paint for a coating, ink or the like.

Formula (1) (anthraquinone)

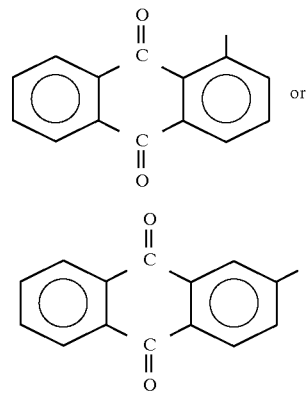

Formula (2) (acridone)

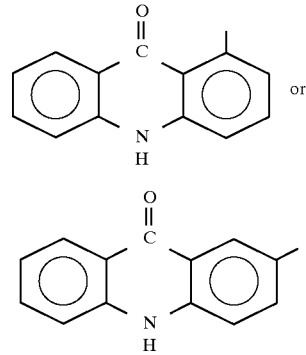

Formula (3) (Example of anthraquinone series organic dye)

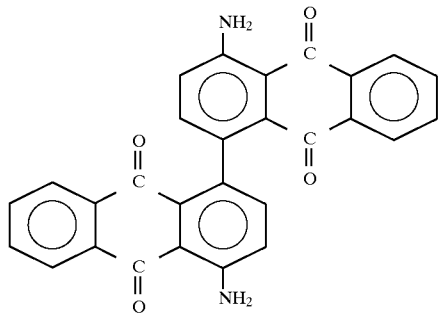

Formula (4) (Example of acridone series organic dye)

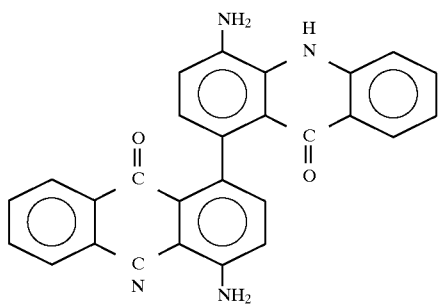

Formula (5) (Example of anthraquinone—acridone series organic dye)

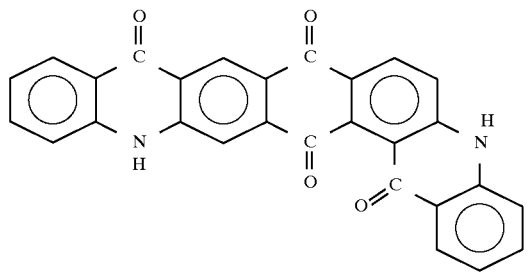

The organic dye or the like described above to which —COCl, —SO$_2$Cl, —CH$_2$Cl, —CH$_2$NHCOCH$_2$Cl, —COOH, —NH$_2$, —NHR (R represents an alkyl group or substituted alkyl group), —OH or the like is introduced in accordance with the method as described in Japanese Patent Application Laid-Open (JP-A) Nos. 56-167762, 52-132031, or the like, is served for reaction with an aqueous linear urethanic polymer or an aqueous linear acrylic polymer to be described later.

The organic dye or the like having —COCl or —SO$_2$Cl can be obtained, for example, by allowing to react the organic dye or the like with chlorosulfonic acid to introduce —SO$_2$Cl or, if the organic dye or the like has a functional group such as a sulfonic group or carboxyl group, by allowing to react such a functional group, for example, with thionyl chloride or phosphorus pentachloride.

The organic dye or the like having —CH$_2$Cl or —CH$_2$NHCOCH$_2$Cl can be obtained by allowing to react the organic dye or the like with paraformaldehyde and chlorosulfonic acid or monochloro acetic acid amide, monochloro acetic acid alkyl amide or the like in polyphosphoric acid or concentrated sulfuric acid.

The organic dye or the like having —NH$_2$ or —NHR (R represents an alkye group or a substitued alkye group) can be obtained, for example, by introducing a phthalimide group to the organic dye or the like, followed by hydrolysis.

Alternatively, the organic dye or the like can also be obtained by preparing an organic dye or the like having —CH$_2$Cl or —CH$_2$NHCOCH$_2$Cl and allowing to react the thus prepared organic dye or the like with a primary or secondary amino compound.

The organic dye or the like having —COOH, for example, copper phthalocyanine having —COOH group can be obtained by adding and reacting trimellitic acid anhydride or pyromellitic acid anhydride to a portion of phthalic acid anhydride used when synthesizing of copper phthalocyanine.

The organic dye or the like having —OH can be obtained by diazotizing a hydroxyalkyl aniline having various functional groups and then coupling the same with various kinds of couplers, or by forming acetoacetic allylide derivative from a hydroxyalkyl aniline having various functional groups and then coupling the derivative with various kinds of couplers.

Alternatively, in a case of copper phthalocyanine, a copper phthalocyanine having —OH group can be obtained by heating chlorinated copper phthalocyanine under alkaline conditions.

The aqueous type pigment dispersing agent according to the present invention has the organic dye or the like only at the terminal end or at the both terminal ends of the aqueous linear urethanic polymer.

At first, an aqueous linear urethanic polymer having at least one group selected from the group consisting of primary amino group, secondary amino group, hydroxy group and isocyanate group only at the terminal end or at the both terminal ends is formed and then the primary amino group, secondary amino group, hydroxy group, or isocyanate group at the terminal end or at the both terminal ends of the aqueous linear urethanic polymer is made to react with an organic dye or the like having at least one reactive group selected from the group consisting of —COCl, —SO$_2$Cl, —CH$_2$Cl, —CH$_2$NHCOCH$_2$Cl, —COOH, —NH$_2$, —NHR (R represents an alkyl group or substituted alkyl group) and —OH, thereby obtaining an aqueous type pigment dispersing agent having the organic dye or the like only at the terminal end or at the both terminal ends of the aqueous linear urethanic polymer.

A process for producing the aqueous linear urethanic polymer having the primary amino group, secondary amino group, hydroxy group or isocyanate group at the terminal end or at the both terminal ends will be explained below.

An aqueous linear urethanic polymer having primary amino group, secondary amino group, hydroxy group or isocyanate group at the terminal end is obtained by making to react a diisocyanate compound with a dihydroxy compound or a diamine compound containing, as an essential component a compound having at least two functional groups such as primary amino group, secondary amino group or hydroxy group capable of reacting with an isocyanate group and having at least one hydrophilic group such as —COOH, —COONa, —COONH$_4$, —SO$_3$H, —SO$_3$Na or —SO$_3$NH$_4$ in the molecule.

For example, the compound having at least two functional groups, such as primary amino group, secondary amino group or hydroxy group, capable of reacting with the isocyanate group and having at least one hydrophilic group as described above in the molecule, include compounds as dimethylol propionic acid, amino acid or amino sulfonic acid and oxyalkylation product or polyesterification product thereof, diamino carboxylic acid, sodium diaminobenzene sulfonate or disodium salt of glycerine monophosphate. A dihydroxy compound or diamine compound containing the above-mentioned compound as the essential component is made to react with isocyanate groups, to obtain an urethanic polymer containing an isocyanate group at the terminal end or at the both terminal ends or a urethanic polymer having an amino group at the terminalend or at the both terminal ends which will be described later. The urethanic polymer containing a terminal isocyanate group at least one terminal end or the urethanic polymer having a terminal amino group at least one terminal end has various types of hydrophilic groups as described above and the urethanic polymer (an be dispersed into an aqueous system by the hydrophilic groups.

The urethanic pigment dispersing agent according to the present invention can be obtained by the three production processes as described below.

That is, a first method comprises allowing to react a dihydroxy compound containing, as the essential component, the compound having at least two hydroxy groups and having at least one hydrophilic group in the molecule as described above with a diisocyanate compound, thereby preparing an aqueous urethanic polymer containing a terminal isocyanate group at least one terminal end, and thereafter allowing to react the aqueous linear urethanic polymer with an organic dye or the like to which at least one reactive group selected from the group consisting of primary amino group, secondary amino group and hydroxy group is introduced. It is general to remove a solvent and replace the solvent with an aqueous medium after the reaction.

A second method comprises allowing to react a dihydroxy compound with a diisocyanate compound to prepare an aqueous linear urethanic polymer containing terminal isocyanate group. Thereafter, the polymer is made to react with a diamine compound to prepare an aqueous linear urethanic polymer having a terminal amino group, and further the resultant aqueous linear urethanic polymer is made to react with an organic (lye or the like to which at least one reactive group selected from the group consisting of —COCl, —SO$_2$Cl, —CH$_2$Cl, —CH$_2$NHCOCH$_2$Cl or —COOH is introduced, In the case of the second method, the hydrophilic group in the aqueous linear urethanic polymer may be present in the urethanic polymer containing a terminal isocyanate group by using a dihydroxy compound having a hydrophilic group as the essential component, or the hydrophilic group may be present in the urethanic polymer having a terminal amino group by using a diamine compound having a hydrophilic group as one of diamine compounds used when chain lengthening.

A third method comprises allowing to react a dihydroxy compound containing, as an essential component, a compound having at least two hydroxy groups and having at least one of various hydrophilic groups in the molecule with a diisocyanate compound, to prepare an aqueous urethanic polymer containing terminal hydroxy group. Thereafter the aqueous linear urethanic polymer is made to react with an organic dye or the like, to which with at least one reactive group selected from the group consisting of —COCl, —SO$_2$Cl, —CH$_2$Cl , —CH$_2$NHCOCH$_2$Cl and —COOH is introduced. It is general to remove a solvent and replace the solvent with an aqueous medium after the reaction.

The aqueous linear urethanic polymer used in the present invention can be obtained by making to react a dihydroxy compound with a diisocyanate compound and, if necessary, further with a diamine compound as described above.

The dihydroxy compound usable herein can include in addition to the dihydroxy compound having the hydrophilic group as described above, water, low molecular weight glycols such as ethylene glycol, diethylene glycol, propylene glycol, butanediol, propanediol, 1,6-hexanediol, neopentyl glycol and cyclohexane dimethanol, and high molecular weight diols such as polyether diols and polyester diols, as well as bisphenols such as bisphenol A and bisphenol F, and glycols obtained by adding alkylene oxides such as ethylene oxide or propylene oxide to bisphenol A or bisphenol F.

The polyether diols, include, for example, polymers, copolymers or graft polymers of tetrahydrofuran, and alkylene oxide such as ethylene oxide, propylene oxide and butylene oxide, or polyether glycols obtained by condensation of hexanediol, methylhexanediol, heptanediol, octanediol or a mixture thereof, and propoxylated or ethoxylated polyether glycols.

The polyester diols include, for example, polyester diols obtained by condensating reaction of saturated or unsaturated low molecular weight glycol such as ethylene glycol, propylene glycol, 1,3-butanediol, 1,4-butanediol, neopentyl glycol, hexanediol, methyl-1,5-pentanediol, octanediol, cyclohexanediol, 2-ethyl-1,3-hexanediol, bisphenol A, diethylene glycol, triethylene glycol or dipropylene glycol, with an aliphatic or aromatic dibasic acid or aromatic dibasic acid ester, polyester diols obtained by ring-opening polymerization of a cyclic ester compound such as ε-caprolacton, polycarbonate diols and silicone diols and, further, a hydroxy-terminated reaction product obtained by the reaction between one of them and a diisocyanate may also be used.

The diisocyanate compound usable herein can include diisocyanates such as tollylene diisocyanate, 4,4'-diphenyl methane diisocyanate, hexamethylene diisocyanate, xylylene diisocyanate, 1,5-naphthalene diisocyanate, isophorone diisocyanate, lysine diisocyanate, hydrogenated 4,4'-diphenyl methane diisocyanate, hydrogenated tollylene diisocyanate, or isocyanate adducts having a glycol or amine added to both terminal ends thereof, or a mixture thereof.

As the synthesis condition in the reaction between the dihydroxy compound and the diisocyanate compound, it is preferred to allow to react these compounds at a reaction temperature ranging from room temperature to 140° C., preferably, from 40° to 100° C. Further, the equivalent ratio of the isocyanate group to the hydroxy group is within a range from about 1.02:1 to about 2:1, preferably, within a range from about 1.05:1 to about 1.5:1. Further, if necessary, known urethanizing catalysts, for example, dibutyl tin dilaurate, tin octylate, triethylamine, N,N-dimethylbenzylamine, sodium hydroxide or diethyl zinc tetra(n-butoxy) titanium may be used. The reaction can be conducted without solvent but an organic solvent inert to the isocyanate can also be used for making the reaction uniform or controlling the viscosity. As such a solvent, there can be mentioned, for example, acetone, methyl ethyl ketone, ethyl acetate, dioxane, acetonitrile, tetrahydrofuran, diethyleneglycol dimethyl ether and N-methylpyrrolidone which may be used alone or as a mixture of them.

The diamine compound used for chain lengthening of the isocyanate-terminated urethanic polymer can include, in addition to the compounds having the hydrophilic group described above, those diamines such as ethylenediamine, trimethylenediamine, tetramethylenediamine, pentamethylenediamine, 1,7-diaminoheptane, 1,8-diaminooctane, xylylenediamine 1,4-diaminocyclohexane, isophoronediamine, phenylenediamine and polyamidoamine or a reaction product having a terminal amino group obtained by reaction between the above-mentioned diamine and an organic diisocyanate compound.

In the step of chain lengthening of the isocyanate-terminated urethanic polymer with the di amine compound, the reaction can be conducted either by dropping a solution prepared by diluting a diamine compound with the inert organic solvent described above into the urethanic polymer containing the terminal isocyanate group or by dropping the urethanic polymer containing terminal isocyanate group to a solution of the diamine compound.

The amount of the diamine compound used is preferably within the range from 1 to 2 equivalent based on 1 equivalent amount of free isocyanate groups in the urethanic polymer containing terminal isocyanate group. The reaction can be carried out at a temperature between room temperature and about 90° C. according to reactivity of the compounds.

The urethanic polymer having terminal amino group which has a lengthened chain by the use of the diamine compound and the organic dye or the like having at least one reactive group selected from the group consisting of —COCl, —SO$_2$Cl, —CH$_2$Cl, —CH$_2$NHCOCH$_2$Cl, and —COOH are generally made to react in a reaction medium such as water, alcohol, acetone or N,N-dimethylformamide, optionally, in the presence of an alkali catalyst, and thereafter the solvent is removed and replaced with an aqueous medium. However, in a case of an azo pigment, a method of effecting coupling after reacting an amine-terminated polymer to a diazo component or a coupler component in advance is industrially advantageous.

Another aqueous type pigment dispersing agent according to the present invention has an organic dye or the like only at the terminal end or at the both terminal ends of the aqueous linea acrylic polymer, and it is only necessary that the dispersing agent is dissolved or dispersed in a pigment dispersion system after introduction of the organic dye or the like. The dispersing agent is obtained either by making to react an aqueous linear acrylic polymer having terminal primary and/or secondary amino group with an organic dye or the like having at least one reactive group selected from the group consisting of —COCl, —SO$_2$Cl, —CH$_2$Cl and —CH$_2$NHCOCH$_2$Cl, or by using an organic dye or the like having —SH as a chain transfer agent upon polymerizing a radical polymerizable unsaturated monomer.

The aqueous linear acrylic polymer having the terminal primary and/or the secondary amino group is preferably a resin having a weight average molecular weight from 3,000 to 100,000 and an acid value from 10 to 200 obtained by polymerizing a monomer having a radical polymerizable unsaturated bond and it is only necessary that the polymer is dissolved or dispersed in a pigment dispersion system.

The monomer having the radical polymerizable unsaturated bond includes, for example, α,β-ethylenically unsaturated carboxylic acid such as acrylic acid, methacrylic acid, crotonic acid, maleic acid, fumaric acid, citraconic acid or itaconic acid, and an unsaturated monomer having sulfonic group such as p-vinylbenzene sulfonic acid and 2-acrylamide propane sulfonic acid.

In this specification, monomers including acrylate and methacrylate, acrylamide and methacrylamide, and the like are represented by (meth)acrylate, (meth)acrylamide, and the like, respectively.

The example for the monomer containing a basic group includes, for example,
N,N-dimethylaminoethyl(meth)acrylate,
N,N-diethylaminoethyl(meth)acrylate,
N,N-dimethylaminoethyl(meth)acrylamide and
N,N-diethylaminoethyl(meth)acrylamide.

Examples of the monomers containing a hydroxy group include, for example, 2-hydroxyethyl-(meth)acrylate or hydroxypropyl(meth)acrylate.

Examples of other monomers, alkyl (meth)acrylate, and vinyl aromatic compounds, etc. can be used, more specifically examples of the alkyl(meth)acrylate include, for example, methyl(meth)acrylate, ethyl(meth)acrylate, propyl (meth)acrylate, butyl(meth)acrylate, hexyl(meth)acrylate, 2-ethylhexyl(meth)acrylate and laury(meth)acrylate. Examples of the vinyl aromatic compound include, for example, styrene, α-methylstyrene, styrene sulfonic acid, vinyltoluene and p-chlorostyrene. In addition, acrylonitrile, vinyl acetate, etc. can also be used.

In a case of using a nitrogen-containing monomer, the monomer must be selected in light of the reactivity of the monomer with the terminal amino group.

The linear acrylic polymer having terminal primary and/ or secondary amino group can be obtained, for example, by using 2-aminoethyl mercaptan or the like having —SH as a chain transfer agent upon polymerization.

The radical polymerization of the monomer can be carried out by a known method, for example, at a reaction temperature about from 50° C. to 220° C. and using a polymerization solvent, for example, a cellosolve solvent, carbitol solvent, ethyleneglycol dialkylene ether solvent, cellosolve-acetate solvent, alcohol solvent, aromatic hydrocarbon solvent, ketone solvent, ether solvent or water which may be used alone or as a mixture of them.

The pigment dispersing agent according to the present invention is for use in an aqueous system, to order to dissolve or disperse the same in an aqueous system, the dispersing agent is used by neutralizing an acidic group such as a carboxylic acid in the linear acrylic polymer with ammonia or an organic amine, or by neutralizing a nitrogencontaining basic group with an organic or inorganic acid if necessary.

The organic dye or the like and the aqueous acrylic polymer may be coupled by making to react —COCl, —SO$_3$Cl, etc. of the organic dye or the like with the primary amino group or the secondary amino group in the aqueous acrylic polymer in a reaction solvent such as water, alcohol, acetone or N,N-dimethylformamide, in the presence of an alkali catalyst, as occasion demands, followed by removing the solvent. In case of an azo pigment, a method of previously allowing to react a terminal primary amino group or secondary amino group of the polymer with a diazo component or a coupler component, followed by coupling is industrially advantageous.

Since —COCl or —SO$_2$Cl is highly reactive as compared with carboxylic group or sulfonic group, reaction with the amino group or the like can be conducted under more moderate condition and an aimed product can be obtained in a high yield, so that the use of such groups is industrially excellent.

Further, the aqueous type pigment dispersing agent in which the organic dye or the like is coupled to the terminal end of the aqueous linear acrylic polymer can also be obtained by using the organic dye or the like having —SH as a chain transfer agent upon polymerization of the radical polymerizable unsaturated monomer described above.

The organic dye having —SH include, for example, mercapto copper phthalocyanine, merccaptoanthraquinone, mercaptoacridone, mercaiptoquinacridone, mercaptodioxazirie, mercaptodiketopyrrolopyrrole, mercaptoanthrapyridine, mercaptoanthanthrone, mercaptoindanthrone, mercaptoflavanthrone, mercaptoperinone, mercaptoperylene, mercaptothioindigo, mercaptoisoindolinone and mercaptobenzimidazolone, or mercaptoanthraquinone and mercaptoacridone.

The organic dye or the like having —SH described above is available as commercial products and, as well as, may be obtained by allowing to react, for example, 2-aminoethyl mercaptane with an organic dye or the like having at least one reactive group selected from the group consisting of —COCl, —SO$_2$Cl, —CH$_2$Cl and —CH$_2$NHCOCH$_2$Cl, thereby introducing —SH into the organic dye or the like.

The aqueous type pigment dispersing agent according to the present invention exhibits an excellent dispersing effect for commercially available pigments. The aqueous type pigment dispersing agent can be applicable, for example, to organic pigments such as azo pigments including soluble or insoluble azo pigments or condensate azo pigments, phthalocyanine pigments, quinacridone pigments, isoindolinone pigments, perylene and perinone pigments, dioxazine pigments, anthraquinone pigments, diketopyrrolopyrrole pigments, anthrapyrimidine pigments, anthanthrone pigments, indanthrone pigments, flavarnthrone pigments and thioindigo pigments, as well as inorganic pigments such as carbon black, titanium oxide, yellow lead, cadmium yellow, cadmium red, red iron oxide, black iron oxide, zinc white, Prussian (Berlin) blue or ultramarine blue.

The pigment composition according to the present invention comprises the aqueous type pigment dispersing agent according to the present invention and a pigment as described above. The blending ratio of the aqueous type pigment dispersing agent according to the present invention to the pigment is preferably from 0.5 to 100 parts by weight based on 100 parts by weight of the pigment. If the ratio is less than 0.5 parts by weight, it is not preferred since the pigment dispersing effect is not sufficient. Further, even if it is used in excess of 100 parts by weight, no more effect can be expected for the excess portion used.

The aqueous pigment dispersion according to the present invention comprises the aqueous type pigment dispersing agent according to the present invention described above, a pigment and an aqueous resin.

The aqueous resin used for the aqueous pigment dispersion according to the present invention can include water dispersible resin or water soluble resin of, for example, acrylic copolymers, styrene-acrylic acid copolymers, styrene-maleic acid copolymers, alkyd, epoxy, polyester or urethane resins. The water dispersible resin or water soluble resin of acrylic copolymer is particularly preferable.

The water dispersible resin or the water soluble resin of the acrylic copolymer may be prepared by emulsion polymerization, soap free polymerization, suspension polymerizing, or may be an aqueous dispersible resin or water soluble resin obtained by neutralizing an acrylic copolymer resin polymerized in a hydrophilic organic solvent, and having free carboxylic acid with ammonia or an organic amine, followed by adding water.

As the acrylic copolymer resin, those having a weight average molecular weight from 5,000 to 300,000 and an acid value from 1 to 200 which are obtained by emulsion polymerization or solution polymerization of 50 to 80% by weight of alkyl (meth)acrylate, 5 to 30% by weight of a monomer containing a carboxylic acid such as acrylic acid, methacrylic acid, maleic acid and itaconic acid and 0 to 20% by weight of other monomer in a hydrophilic organic solvent are particularly preferred.

The alkyl (meth)acrylates described above can include methyl (meth)acrylate, ethyl (meth)acrylate, propyl (meth)acrylate, n-butyl (meth)acrylate, isopropyl (meth)acrylate, iso-butyl (meth)acrylate, 2-ethylhexyl (meth)acrylate, n-hexyl (meth)acrylate, lauryl (meth)acrylate and the like.

Other monomers described above can include, for example, 2-hydroxyethyl (meth)acrylate, 2-hydroxypropyl (meth)acrylate, acrylamide, N-methylol acrylamide, diacetone acrylamide, glycidyl (meth)acrylate, styrene, vinyl toluene, vinyl acetate, acrylonitrile, vinyl alcohol, ethylene and the like.

The aqueous medium for the aqueous resin used in the present invention may consist only of water. However, as occasion demands, water miscible organic solvent, for example, alcohol solvents such as ethyl alcohol, isopropyl alcohol, n-propyl alcohol or n-butanol, and mono- or di-alkyl ether of ethylene glycol or diethylene glycol can be mixed up to 50% by weight in the aqueous medium.

The amount of the aqueous resin used is preferably from 5 to 500 parts by weight as a solid based on 100 parts by weight of a pigment. Particularly, in case that the aqueous resin is used for concentrated dispersion, the aqueous resin is preferably from 5 to 200 parts by weight as a solid based on 100 parts by weight of the pigment. In case that the aqueous resin is used for paint or printing ink, the aqueous resin is preferably from 100 to 500 parts by weight as the solid based on 100 parts by weight of the pigment. If the aqueous resin is less than 5 parts by weight based on 100 parts by weight of the pigment, the pigment is less dispersible. On the other hand, if it is more than 500 parts by weight, since coloring is insufficient, it is not sometimes suitable to the use as paint or printing ink. In the case of use as paint or printing ink, a curing agent resin such as a melamine resin, a curing catalyst or a surface active agent may be added.

In the aqueous pigment dispersion according to the present invention, the aqueous type pigment dispersing agent is preferably from 0.5 to 100 parts by weight based on 100 parts by weight of the pigment. If the dispersing agent is less than 0.5 parts by weight, the effect of dispersing the pigment is insufficient. Further, even if it is used in excess of 100 parts by weight, no more effect can be expected for the excess portion.

The aqueous pigment dispersion according to the present invention can be prepared by the method as described below.

1. Adding and dispersing a pigment composition obtained by previously mixing a pigment and an aqueous type pigment dispersing agent into an aqueous vehicle (that is, aqueous resin and aqueous medium).
2. Adding and dispersing a pigment and an aqueous type pigment dispersing agent to an aqueous vehicle.
3. Dispersing a pigment and an aqueous type pigment dispersing agent separately into aqueous vehicle in advance and mixing the resultant dispersions. In this case, the aqueous type pigment dispersing agent may be dispersed with an aqueous medium, singly.
4. After dispersing a pigment in an aqueous vehicle, adding an aqueous type pigment dispersing agent to the resultant aqueous pigment dispersion and the aimed effect can be obtained by any of the methods.

For the method of preparing the pigment composition according to the present invention, although a sufficient dispersing effect can be obtained by merely mixing a pigment powder and the aqueous type pigment dispersing agent according to the present invention described above, a further preferred effect can be obtained by a mixing method, for example, of mechanically mixing by using a kneader, roll, attritor, supermill, or various kinds of pulverizers and dispersers, adding a solution containing an aqueous type pigment dispersing agent according to the present invention to a suspension system of the pigment in water or organic solvent thereby depositing the pigment dispersing agent onto the surface of the pigment, or co-dissolving an organic pigment and a pigment dispersing agent together with a solvent having a strong dissolving power such as sulfuric acid and then coprecipitating them with a poor solvent such as water.

For dispersing the pigment or the pigment composition into a liquid dispersion or solution of the aqueous resin, it is preferred to use a disperser such as a dissolver, high speed mixer, homomixer, kneader, roll mill, sand mill or attritor.

(EXAMPLES)

Preparation Example 1

(Reaction of amine-terminated urethane polymer with organic dye or the like having —COOH)

To a four-necked flask equipped with a thermometer a stirrer and a reflux cooling tube, were charged 200 parts of polypropylene glycol (hydroxyl value: 55 mg KOH/g), 20.6 parts of dimethylol propionic acid, 200 parts of N-methoyl pyrrolidone and 0.075 parts of tin octylate and heated at 80° C. with stirring under a nitrogen atmosphere. After refluxing for one hour, 69.9 parts of isophorone diisocyanate were added thereto and reacted at the same temperature for 4 hours to obtain a solution of an isocyanate-terminated prepolymer. Thereafter, the reaction solution was cooled to 4° C., and 441 parts of the resultant prepolymer solution were dropped in a mixed solution of 12.1 parts of isophorone diamine and 180 parts of N-methyl pyrrolidone, then the mixture was allowed to react further for 2 hours at the elevated temperature of 60° C. to obtain an amine-terminated urethanic polymer solution. The resulting polymer had a number average molecular weight of 21,000 and an acidic value of 30 mg KOH/g.

To the solution of the amine-terminated urethane polymer, were added 400 parts of N-methylpyrrolidone and 8.5 parts of triethyleamine and then 22.2 parts of copper phthalocyanine carboxylic acid (containing carboxyl groups by the number of 1.2 in average per one molecule) were added and allowed to react under reflux for 2 hours. Unreacted components and the solvent were removed to obtain a paste containing 243 parts of compound (1).

Preparation Example 2
(Reaction of isocyanate-terminated urethane polymer with organic dye or the like having —NH$_2$)

To a four-necked flask equipped with a thermometer, a stirrer and a reflux cooling tube, were charged 200 parts of polypropylene glycol (hydroxyl value: 55 mg KOH/g), 20.6 parts of dimethylol propionic acid, 200 parts of N-methylpyrrolidone and 0.075 parts of tin octylate and heated to 80° C. with stirring under a nitrogen atmosphere. After refluxing for one hour, 64.9 parts of isophorone diisocyanate were added and allowed to react at the same temperature for 4 hours to obtain a solution of an isocyanate-terminated prepolymer. The polymer had a number average molecular weight of 7,000 and an acid value of 30 mg KOH/g.

To the solution of the isocyanate-terminated prepolymer were added 400 parts of N-methylpyrrolidone and 73.0 parts of aminomethyl copper phthalocyanine and were allowed to react at 80° C. for 4 hours. Unreacted components and the solvent were removed to obtain a paste containing 269 parts of compound (2).

Preparation Example 3
(Reaction of isocyanate-terminated urethane polymer with organic dye or the like having —OH)

To a four-necked flask equipped with a thermometer, a stirrer and a reflux cooling tube, were charged 200 parts of polypropylene glycol (hydroxyl value: 55 mg KOH/g), 20.6 parts of dimethylol propionic acid, 200 parts of N-methylpyrrolidone and 0.075 parts of tin octylate and heated to 80° C. with stirring in a nitrogen atmosphere. After refluxing for one hour, 58.7 parts of isophorone diisocyanate were added and allowed to react at the same temperature for 4 hours to obtain a solution of an isocyanate-terminated prepolymer. The polymer had a number average molecular weight of 22,000 and an acid value of 30 mg KOH/g.

To the solution of the isocyanate-terminated prepolymer were added 400 parts of N-methylpyrrolidone and 22.3 parts of hydroxy copper phthalocyanine and were allowed to react at 80° C. for 4 hours unreacted components and the solvent were removed to obtain a paste containing 233 parts of compound (3).

Preparation Example 4
(Reaction of amine-terminated urethane polymer with organic dye or the like having —COOH)

After synthesis in the same procedures as in Preparation Example 1 except for replacing 22.2 parts of copper phthalocyanine carboxylic acid with 10.7 parts of quinacridone carboxylic acid (containing carboxyl groups by the number of 1.5 in average per one molecule), unreacted components and the solvent were removed, to obtain a paste containing 228 parts of compound (4).

Preparation Example 5
(Reaction of amine-terminated urethane polymer with organic dye or the like having —COOH)

After synthesis in the same procedures as in Preparation Example 1 except for replacing 22.2 parts of copper phthalocyanine carboxylic acid with 16.6 parts of dioxazine carboxylic acid (containing carboxyl groups by the number of 1.7 in average per one molecule), unreacted components and the solvent were removed, to obtain a paste containing 213 parts of compound (5).

Preparation Example 6
(Reaction of isocyanate-terminated urethane polymer with organic dye or the like having —OH)

After synthesis in the same procedures as in Preparation Example 3 except for replacing 22.3 parts of hydroxy copper phthalocyanine with 12,3 parts of hydroxy quinacridone, unreacted components and the solvent were removed, to obtain a paste containing 218 parts of compound (6).

Preparation Example 7

After condensating the amine-terminated polymer obtained in Preparation Example 1 and p-nitrobenzoic acid in a customary manner, the nitro group is reduced to an amino group. The polymer having the amino group was diazotized with sodium nitrite. The compound (a) and the following compound (b) were coupled by a customary method, and unreacted components and the solvent were removed, to obtain a paste containing compound (7). The flowchart for synthesis is shown below.

Preparation Example 7.

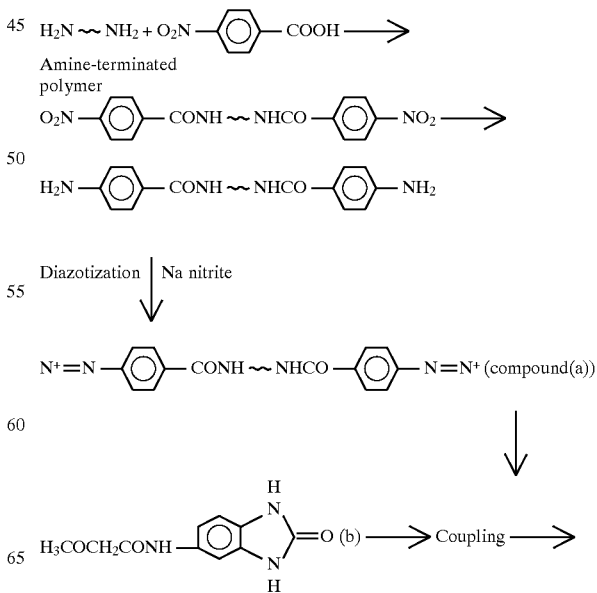

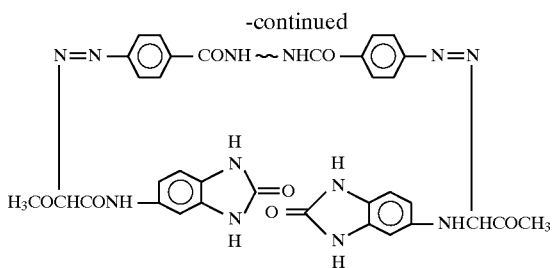

Preparation Example 8
(Reaction of —OH-terminated urethane polymer with organic dye or the like having —COOH)

To a four-necked flask equipped with a thermometer, a stirrer and a reflux cooling tube, were charged 200 parts of polypropylene glycol (hydroxyl value 55 mg KOH/g), 18.7 parts of dimethylol propionic acid, 200 parts of N-methylpyrrolidone, and 0.075 parts of tin octylate and heated to 80° C. with stirring in a nitrogen atmosphere. After refluxing for one hour, 42.3 parts of isophorone diisocyanate were added and allowed to react at that temperature for 4 hours, to obtain a hydroxyl-terminated polymer solution. The polymer had a number average molecular weight of 6,000 and an acid value of 30 mg KOH/g.

To the solution of the hydroxyl-terminated polymer, were added 400 parts of N-methylpyrrolidone and 22.2 parts of copper phthalocyanine carboxylic acid (containing carboxyl groups by the number of 1.2 in average per one molecule) and allowed to react under reflux for 2 hours. Unreacted components and the solvent were removed to obtain a paste containing 226 parts of a compound (8).

Preparation Example 9
(Reaction of amine-terminated urethane polymer with organic dye or the like having —SO$_2$Cl)

To a four-necked flask equipped with a thermometer, a stirrer and a reflux cooling tube, were charged 200 parts of polypropylene glycol (hydroxyl value 55 mg KOH/g), 20.6 parts of dimethylol propionic acid, 200 parts of methyl ethyl ketone and 0.075 parts of tin octylate and heated to 80° C. with stirring in a nitrogen atmosphere. After refluxing for one hour, 69.9 parts of isophorone diisocyanate were added and reacted at that temperature for 4 hours, to obtain a solution of isocyanate terminated prepolymer. Thereafter, the reaction solution was cooled to the temperature of 40° C., and 441 parts of the prepolymer solution was dropped to a mixed solution of 14.5 parts of isophorone diamine and 180 parts of methyl ethyl ketone, and then heated to 60° C. and allowed to react for 2 hours to obtain a solution of an amine-terminated polymer. The polymer had a number average molecular weight of 10,000 and an acid value of 30 mg KOH/g.

To a mixture formed by adding 400 parts of methyl ethyl ketone and 17.0 parts of triethylamine to a solution of amine-terminated polymer thus obtained were added 49.2 parts of copper phthalocyanine sulfonyl chloride (containing chlorosulfonyl groups by the number of 1.2 in average per one molecule) and allowed to react at 80° C. for 2 hours. Unreacted components and the solvents were removed to obtain a paste containing 258 parts of compound (9).

Preparation Example 10
(Reaction of amine-terminated urethane polymer with organic dye or the like having —COCl)

To a four-necked flask equipped with a thermometer, a stirrer and a reflux cooling tube, were charged 200 parts of polypropylene glycol (hydroxyl value 55 mg KOH/g), 20.6 parts of dimethylol propionic acid, 200 parts of methyl ethyl ketone and 0.075 parts of tin octylate and heated to 80° C. with stirring in a nitrogen atmosphere. After refluxing for one hour, 67.1 parts of isophorone diisocyanate were added and reacted at that temperature for 4 hours, to obtain a solution of the isocyanate-terminated prepolymer. Thereafter, the reaction solution was cooled to 40° C., and 439 parts of a prepolymer solution was dropped to a mixed solution of 10.0 parts of isophorone diamine and 180 parts of methyl ethyl ketone, and then heated to 60° C. and allowed to react for 2 hours, to obtain a solution of an amine terminated polymer. The polymer had a number average molecular weight of 20,000 and an acid value of 30 mg KOH/g.

To a mixture formed by adding 400 parts of methyl ethyl ketone and 8.1 parts of triethylamine to a solution of the amine-terminated polymer were charged 25.9 parts of copper phthalocyanine carbonyl chloride (containing carbonyl chloride groups by the number of 1.0 in average per one molecule) and allowed to react at 80° C. for 2 hours. Unreacted components and the solvents were removed to obtain a paste containing 262 parts of compound (10).

Preparation Example 11
(Reaction of amine-terminated urethane polymer with organic dye having —SO$_2$Cl)

After synthesis in the same procedures as those in Preparation Example 9 except for replacing 49.2 parts of copper phthalocyanine sulfonyl chloride with 26.1 parts of quinacridone sulfonyl chloride (containing chlorosulfonyl groups by the number of 1.5 in average per one molecule), unreacted components and the solvent were removed, to obtain a paste containing 233 parts of compound (11).

Preparation Example 12
(Reaction of amine-terminated urethane polymer with organic dye having —SO$_2$Cl)

After synthesis in the same procedures as those in Preparation Example 10 except for replacing 25.9 parts of copper phthalocyanine carbonyl chloride with 18.1 parts of dioxazine sulfonyl chloride (containing chlorosulfonyl groups by the number of 1.7 in average per one molecule), unreacted components and the solvent were removed, to obtain a paste containing 229 parts of compound (12).

Preparation Example 13

After condensating the amine-terminated polymer obtained in a Preparation Example 9 and p-nitrobenzole chloride in a customary method, the nitro group is reduced to amino group to obtain compound (c). A polymer having the amino group was diazotized with sodium nitrite. The resultant compound and a compound (b) as described in Preparation Example 7 were coupled by a customary method and unreacted components and the solvent were removed to obtain a paste containing compound (13). The flowchart of the synthesis procedure is shown below.

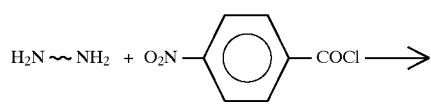

Amine-terminated polymer

-continued

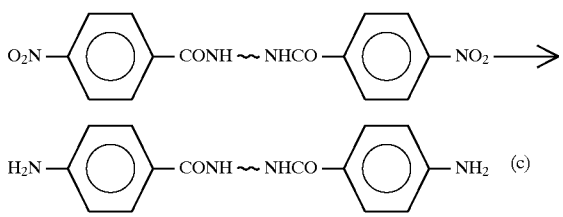

Diazotization and coupling were conducted in the same manner as those in Preparation Example 7.

Preparation Example 14
(Reaction of amine-terminated urethane polymer with organic dye or the like having —CH$_2$Cl)

After synthesis in the same procedures as those in Preparation Example 9 except for replacing 49.2 parts of copper phthalocyanine sulfonyl chloride with 23.0 parts of chloromethyl copper phthalocyanine (containing chloromethyl groups by the number of 1.2 in average per one molecule), unreacted components and the solvent were removed to obtain a paste containing 230 parts of compound (14).

Preparation Example 15
(Reaction of amine-terminated urethanic polymer with organic dye or the like having —CH$_2$NHCOCH$_2$Cl)

After synthesis in the same procedures as those in Preparation Example 9 except for replacing 49.2 parts of copper phthalocyanine sulfonyl chloride with 33.4 parts of chloro acetic acid amidomethyl quinacridone (containing chloroacetoaminomethyl groups by the number of 1.7 in average per one molecule), unreacted components and the solvent were removed to obtain a paste containing 240 parts of a compound (15).

Preparation Example 16
(Reaction of amine-terminated urethane polymer with organic dye or the like having —COCl)

After synthesis in the same procedures as those in Preparation Example 9 except for replacing 49.2 parts of copper phthalocyanine sulfonyl chloride with 23.1 parts of anthraquinone-2-carbonyl chloride, unreacted components and the solvent were removed to obtain a paste containing 232 parts of compound (16).

Preparation Example 17
(Reaction of amine-terminated urethane polymer with organic dye or the like having —SO$_2$Cl)

After synthesis in the same procedures as those in Preparation Example 10 except for replacing 25.9 parts of copper phthalocyanine carbonyl chloride with 11.0 parts of anthraquinone-2-sulfonyl chloride, unreacted components and the solvent were removed to obtain a paste containing 232 parts of compound (17).

Preparation Example 18
(Reaction of isocyanate-terminated urethane polymer with organic dye or the like having —NH$_2$)

After synthesis in the same procedures as those in Preparation Example 3 except for replacing 22.3 parts of hydroxy copper phthalocyanine with 26.9 parts of 2-amino-anthraquinone, unreacted components and the solvent were removed, to obtain a paste containing 230 parts of compound (18).

Preparation Example 19
(Reaction of amine-terminated urethane polymer with organic dye or the like having —COOH)

After synthesis in the same procedures as those in Preparation Example 9 except for replacing 49.2 parts of copper phthalocyanine sulfonyl chloride with 22.0 parts of anthraquinone-2-carboxylic acid, unreacted components were removed and the solvent was replaced with water, and thereafter, the contents were neutralized with dimethylamino ethanol, to obtain an aqueous paste containing 230 parts of compound (19).

Preparation Example 20
(Reaction of amine-terminated urethane polymer with organic dye or the like having —COCH)

After synthesis in the same procedures as those in Preparation Example 10 except for replacing 25.9 parts of copper phthalocyanine carbonyl chloride with 10.5 parts of acridone-2-carbonyl chloride, unreacted components were removed and the solvent was replaced with water, and thereafter, the reaction products were neutralized with dimethylamino ethanol, to obtain an aqueous paste containing 242 parts off compound (20).

Preparation Example 21
(Reaction of isocyanate-terminated urethane polymer with organic dye or the like having —NH$_2$)

After synthesis in the same procedures as those in Preparation Example 3 except for replacing 22.3 parts of hydroxy copper phthalocyanine with 25.3 parts of 2-amino-acridone, unreacted components were removed and the solvent was replaced with water, and thereafter, the reaction products were neutralized with dimethylamino ethanol, to obtain an aqueous paste containing 228 parts of compound (21).

Preparation Example 22
(Reaction of amine-terminated urethane polymer with organic dye or the like having —CH$_2$Cl)

After synthesis in the same procedures as those in Preparation Example 9 except for replacing 49.2 parts of copper phthalocyanine sulfonyl chloride with 20.8 parts of chloromethyl acridone, unreacted components and the solvent were removed, to obtain a paste containing 228 parts of compound (22).

Preparation Example 23
(Reaction of amine-terminated urethane polymer with organic dye or the like having —CH$_2$NHCOCH$_2$Cl)

After synthesis in the same procedures as those in Preparation Example 10 except for replacing 25.9 parts of copper phthalocyanine (carbonyl chloride with 20.8 parts of chloroacetic acid amidomethyl anthraquinone (containing chloroacetic acid amidomethyl groups by the number of 1.0 in average per one molecule), unreacted components and the solvent were removed, to obtain a paste containing 245 parts of compound (23).

Preparation Example 24
(Reaction of —OH-terminated urethane polymer with organic dye or the like having —COCl)

After synthesis in the same procedures as those in Preparation Example 8 except for replacing 22.2 parts of copper phthalocyanine carboxylic acid with 9.5 parts of anthraquinone-2-carbonyl chloride, unreacted components and the solvent were removed, to obtain a paste containing 208 parts of compound (24).

Preparation Example 25
(Reaction of amine-terminated acryl polymer with organic dye or the like having —COCl)

To a four-necked flask equipped with a thermometer, a stirrer, a refluxing cooling tube and a nitrogen gas introduction tube, were charged 350 parts of methanol and heated to 60° C. Thereafter, a mixture comprising:

| | |
|---|---|
| Acrylic acid | 10 parts |
| Ethyl acrylate | 113 parts |
| Methyl methacrylate | 101 parts |
| Vinyl acetate | 25 parts |
| and a mixture comprising: | |
| AIBN (manufactured by Otsuka Chemical) | 3 parts |
| 2-aminoethyl mercaptan | 4 parts |
| Methanol | 50 parts | were dropped over a 2 hour period while introducing nitrogen gas. Further, the mixture was made to react for 2 hours while being kept at the same temperature to obtain a solution of a primary amino group-terminated polymer. The polymer had a weight average molecular weight of 8,000 and an acid value of 30 mg-KOH/g.

To the solution of the primary amino group-terminated polymer described above were added 300 parts of methanol and 15.6 parts of triethylamine to form a mixture, to which 49.8 parts of copper phthalocyanine carbonyl chloride were added and allowed to react at. 60° C. for 2 hours. Unreacted components and the solvent were removed, to obtain 193 parts of a paste.

After adding 400 parts of water to 100 parts of the paste thus obtained and replacing the solvent with water, the contents were neutralized with dimethylaminoethanol, to obtain an aqueous paste containing 95 parts of compound (25). The pH value of the aqueous paste was 8.3.

Preparation Example 26
(Reaction of amine-terminated acryl polymer with organic dye or the like having —SO$_2$Cl)

To a four-necked flask equipped with a thermometer, a stirrer, a refluxing cooling tube and a nitrogen gas introduction tube, were charged 350 parts of methanol were charged and heated to 60° C. Thereafter, a mixture comprising:

| | |
|---|---|
| Acrylic acid | 19 parts |
| Ethyl acrylate | 113 parts |
| Methyl methacrylate | 93 parts |
| Vinyl acetate | 25 parts |
| and a mixture comprising: | |
| AIBN (manufactured by Otsuka Chemical) | 1 part |
| 2-aminoethyl mercaptan | 1.3 parts |
| Methanol | 50 parts | were dropped over a 2 hour period while introducing nitrogen gas. Further, the mixture was made to react for 2 hours while being kept at the same temperature to obtain a solution of a primary amino group-terminated polymer. The polymer had a weight average molecular weight of 25,000 and an acidic value of 60 mg-KOH/g.

To the solution of the primary amino group-terminated polymer described above were added 300 parts of methanol and 5.1 parts of triethylamine to form a mixture, to which 14.8 parts of copper phthalocyanine sulfonyl chloride (containing chlorosulfonyl groups by the number of 1.2 in average per one molecule) were added and reacted at 60° C. for 2 hours. Unreacted products and the solvent were removed, to obtain 185 parts of a paste.

After adding 400 parts of water to 100 parts of the paste thus obtained and replacing the solvent with water, the contents were neutralized with dimethylaminoethanol, to obtain an aqueous paste containing 95 parts of compound (26). The pH value of the aqueous paste was 8.1.

Preparation Example 27
(Reaction of amine-terminated acryl polymer with organic dye or the like having —COCl)

After synthesis in the same procedures as those in Preparation Example 25 except for replacing 49.8 parts of copper phthalocyanine carbonyl chloride with 29.4 parts of quinacridone carbonyl chloride, unreacted components and the solvent were removed, to obtain 197 parts of a paste. After adding 400 parts of water to 100 parts of the paste thus obtained and replacing the solvent with water, the contents were neutralized with dimethylaminoethanol, to obtain an aqueous paste containing 95 parts of a compound (27). The pH value of the aqueous paste was 8.2.

Preparation Example 28
(Reaction of amine-terminated acryl polymer with organic dye or the like having —SO$_2$Cl)

After synthesis in the same procedures as those in Preparation Example 26 except for replacing 14.8 parts of copper phthalocyanine sulfonyl chloride with 7.8 parts of quinacridone sulfonyl chloride (containing chlorosulfonyl groups by the number of 1.5 in average per molecule), unreacted components and the solvent were removed to obtain 198 parts of a paste. After adding 400 parts of water to 100 parts of the paste thus obtained and replacing the solvent with water, the mixture was were neutralized with dimethylamino ethanol, to obtain an aqueous paste containing 95 parts of compound (28). The pH value of the aqueous paste was 8.3.

Preparation Example 29
(Reaction of amine-terminated acryl polymer with organic dye on the like having —SO$_2$Cl)

After synthesis in the same procedures as those in Preparation Example 26 except for replacing 14.8 parts of copper phthalocyanine sulfonyl chloride with 11.4 parts of dioxazine sulfonyl chloride (containing chlorosulfonyl groups by the number of 1.7 in average per molecule), unreacted components and the solvent were removed, to obtain 202 parts of a paste. After adding 400 parts of water to 100 parts of the paste thus obtained and replacing the solvent with water, the contents were neutralized with dimethylamino ethanol, to obtain an aqueous paste containing 95 parts of compound (29). The pH value of the aqueous paste was 8.2.

Preparation Example 30

To the solution containing 100 parts of the primary amine-terminated polymer prepared in Preparation Example 26 were added 400 parts of water and the solvent was replaced with water to form a liquid suspension, to which 2.8 parts of acetoacetyl amino benzene sulfonyl chloride were added. The thus obtained compound and a diazonium solution formed by diazotizing 3,3-dichlorobenzidine by a customary method were subjected to coupling by a customary method and unreacted components were removed. Subsequently, the contents were neutralized with dimethyl amino ethanol to obtain an aqueous paste containing 148 parts of compound (30). The pH value of the aqueous paste was 8.3.

Preparation Example 31
(Reaction of amine-terminated acryl- polymer with organic dye or the like having —CH$_2$Cl)

After synthesis in the same procedures as those in Preparation Example 25 except for replacing 49.8 parts of copper phthalocyanine carbonyl chloride with 49.6 parts of chloromethyl copper phthalocyanine (containing chloromethyl groups by the number of 1.2 in average per molecule), unreacted components and the solvent were removed, to obtain 191 parts of a paste. After adding 400 parts of water to 100 parts of the paste thus obtained and replacing the solvent with water, the contents were neutralized with dimethylamino ethanol to obtain an aqueous paste containing 95 parts of compound (31). The pH value of the aqueous paste was 8.3.

Preparation Example 32
(Reaction of amine-terminated acryl polymer with organic dye or the like having —CH$_2$NHCOCH$_2$Cl)

After synthesis in the same procedures as those in Preparation Example 25 except for replacing 49.8 parts of copper phthalocyanine carbonyl chloride with 55.0 parts of chloroacetic acid amidomethyl phthalocyanine (containing chloroacetic acid amidomethyl groups by the number of 1.2 in average per molecule), unreacted components and the solvent were removed, to obtain 203 parts of a paste. After adding 400 parts of water to 100 parts of the paste and replacing the solvent with water, the contents were neutralized with dimethylaminoethanol to obtain an aqueous paste containing 98 parts of compound (32). The pH value of the aqueous paste was 8.2.

Preparation Example 33
(Reaction of amine-terminated acryl polymer with organic dye or the like having —COCl)

After synthesis in the same procedures as those in Preparation Example 25 except for replacing 49.8 parts of copper phthalocyanine carbonylchloride with 21.1 parts of anthraquinone carbonylchloride, unreacted components and the solvent were removed, and 700 parts of water were added to replace the solvent with water. Thereafter, the contents were neutralized with dimethylaminoethanol, to obtain an aqueous paste containing 186 parts of compound (33). The pH value of the aqueous paste was 8.4.

Preparation Example 34
(Reaction of amine-terminated acryl polymer with organic dye or the like having —SO$_2$Cl)

After synthesis in the same procedures as those in Preparation Example 26 except for replacing 14.8 parts of copper phthalocyanine carbonylchloride with 6.9 parts of anthraquinone sulfonyl chloride, unreacted components and the solvent were removed, and 700 parts of water were added to replace the solvent with water. Thereafter, the contents were neutralized with dimethylaminoethanol, to obtain an aqueous paste containing 185 parts of compound (34). The pH value of the aqueous paste was 8.2.

Preparation Example 35
(Reaction of amine-terminated acryl polymer with organic dye or the like having —COCl)

After synthesis in the same procedures as those in Preparation Example 26 except for replacing 14.8 parts of copper phthalocyanine sulfonylchloride with 5.8 parts of acridone carbonyl chloride, unreacted components and the solvent were removed, and 700 parts of water were added to replace the solvent with water. Thereafter, the contents were neutralized with dimethylaminoethanol, to obtain an aqueous paste containing 190 parts of compound (35). The pH value of the aqueous paste was 8.2.

Preparation Example 36
(Reaction of amine-terminated acryl polymer with organic dye or the like having —CH$_2$Cl)

After synthesis in the same procedures as those in Preparation Example 25 except for replacing 49.8 parts of copper phthalocyanine carbonylchloride with 19.0 parts of chloromethyl acridone, unreacted components and the solvent were removed, and 700 parts of water were added to replace the solvent with water. Thereafter, the contents were neutralized with dimethylaminoethanol, to obtain an aqueous paste containing 184 parts of compound (36). The pH value of the aqueous paste was 8.4.

Preparation Example 37
(Reaction of amine-terminated acryl polymer with organic dye or the like having —CH$_2$NHCOCH$_2$Cl)

After synthesis in the same procedures as those in Preparation Example 26 except for replacing 14.8 parts of copper phthalocyanine sulfonylchloride with 7.1 parts of chloroacetic acid amidomethyl anthraquinone, unreacted components and the solvent were removed, and 700 parts of water were added to replace the solvent with water. Thereafter, the contents were neutralized with dimethylaminoethanol, to obtain an aqueous paste containing 192 parts of compound (37). The pH value of the aqueous paste was 8.2.

Preparation Example 38

To a four-necked flask equipped with a thermometer, a stirrer, a refluxing cooling tube and a nitrogen gas introduction tube, were charged 350 parts of butyl carbitol and heated to 110° C. Thereafter, a mixture comprising:

| | |
|---|---|
| Acrylic acid | 19 parts |
| Ethyl acrylate | 113 parts |
| Methyl methacrylate | 93 parts |
| Vinyl acetate | 25 parts |
| and a mixture comprising: | |
| AIBN (manufactured by Otsuka Chemical) | 3 parts |
| Mercaptoquinacridone | 17.7 parts |
| Butylcarbitol | 150 parts | were dropped over a 2 hour period while introducing nitrogen gas. Further, the contents were reacted for 2 hours while being kept at the same temperature to obtain a solution of a quinacridone-terminated polymer. The polymer had a weight average molecular weight of 9,000 and an acid value of 60 mg-KOH/g. Unreacted components and the solvent were removed to obtain 238 parts of a paste.

After adding 400 parts of water to 100 parts of the paste and replacing the solvent with water, the contents were neutralized with dimethylaminoethanol, to obtain an aqueous paste containing 95 parts of compound (38). The pH value of the aqueous paste was 8.2.

Preparation Example 39

To a four-necked flask equipped with a thermometer, a stirrer, a refluxing cooling tube and a nitrogen gas introduction tube, were charged 350 parts of butyl carbitol and heated to 110° C. Thereafter, a mixture comprising:

| | |
|---|---|
| Acrylic acid | 33 parts |
| Ethyl acrylate | 108 parts |
| Methyl methacrylate | 84 parts |
| Vinyl acetate | 25 parts |
| and a mixture comprising: | |
| AIBN (manufactured by Otsuka Chemical) | 1 part |
| Mercaptoquinacridone | 5.8 parts |
| Butylcarbitol | 100 parts | were dropped over a period of about 2 hours while introducing nitrogen gas. Further, the contents were made to react for 2 hours while being kept at the same temperature to obtain a solution of a quinacridone-terminated polymer. The polymer had a weight average molecular weight of 30,000 and an acid value of 100 mg KOH/g. Unreacted components and the solvent were removed to obtain 230 parts of a paste.

After adding 400 parts of water to 100 parts of the paste and replacing the solvent with water, the contents were neutralized with dimethylaminoethanol, to obtain an aqueous paste containing 95 parts of compound (39). The pH value of the aqueous paste was 8.1.

Preparation Example 40

After conducting polymerization in the same procedures as those in Preparation Example 39 except for replacing 5.8 parts of mercaptoquinacridone with 10.3 parts of mercapto copper phthalocyanine, unreacted components and the solvent were removed, to obtain 228 parts of a paste.

After adding 400 parts of water to 100 parts of the paste and replacing the solvent with water, the contents were neutralized with dimethylaminoethanol to obtain an aqueous paste containing 96 parts of compound (40). The pH value of the aqueous paste was 8.3.

Preparation Example 41

After conducting polymerization in the same procedures as those in Preparation Example 39 except for replacing 5.8 parts of mercaptoquinacridone with 10.6 parts of mercapto dioxazine, unreacted components and the solvent were removed, to obtain 234 parts of a paste.

After adding 400 parts of water to 100 parts of the paste and replacing the solvent with water, the contents were neutralized with dimethylaminoethanol to obtain an aqueous paste containing 96 parts of compound (41). The pH value of the aqueous paste was 8.2.

Preparation Example 42

After conducting polymerization in the same procedures as those in Preparation Example 38 except for replacing 17.7 parts of mercaptoquinacridone with 12.5 parts of mercapto anthraquinone, unreacted components and the solvent were removed, to obtain 238 parts of a paste.

After adding 400 parts of water to 100 parts of the paste and replacing the solvent with water, the contents were neutralized with dimethylaminoethanol to obtain an aqueous paste containing 95 parts of compound (42). The pH value of the aqueous paste was 8.2.

Preparation Example 43

After conducting polymerization in the same procedures as those in Preparation Example 39 except for replacing 5.8 parts of mercaptoquinacridone with 4.1 parts of mercapto anthraquinone, unreacted components and the solvent were removed, to obtain 238 parts of a paste.

After adding 400 parts of water to 100 parts of the paste and replacing the solvent with water, the contents were neutralized with dimethylaminomethanol, to obtain an aqueous paste containing 95 parts of compound (43). The pH value of the aqueous paste was 8.1.

Preparation Example 44

After conducting polymerization in the same procedures as those in Preparation Example 39 except for replacing 5.8 parts of mercapto anthraquinone with 3.9 parts of mercapto acridone, unreacted components and the solvent were removed, to obtain 234 parts of a paste.

After adding 400 parts of water to 100 parts of the paste and replacing the solvent with water, the contents were neutralized with dimethylaminoethanol to obtain an aqueous paste containing 96 parts of compound (44). The pH value of the aqueous paste was 8.2.

Preparation Examples 1–44 are collectively shown as in Tables 1 and 2.

Examples 1–90, Comparative Examples 1–8

As shown in Tables 3 and 4, pigments, compounds (1)–(44) synthesized in Preparation Examples 1–44, solutions of water soluble acrylic copolymer resins (weight average molecular weight 25,000, acid value 60 mg KOH/g, acrylic acid/2-hydroxyethyl methacrylate/ethyl methacrylate/methyl methacrylate/vinyl acetate copolymer, 20% solid contents), and ion exchanged water were blended and dispersed, and then melamine resin ("CYMEL 303", manufactured by Mitsui Cytec Ltd.) were blended to obtain aqueous acrylic resin/amino resin type paint. Numerical values in the columns for the pigment, compound and solvent (water) in the paint composition in Tables 3 and 4 indicate parts by weight.

The thus obtained aqueous paint was applied onto a PET film by a film applicator and baked at 140° C. for 30 min.

As shown in Tables 3 and 4, since the pigment was dispersed more finely in the system using the pigment dispersing agent according to the present invention, the gloss of the coating film was excellent in comparison with that of the system not using the pigment dispersing agent.

According to the present invention, it is possible in the pigment dispersion such as for ink or paint, to improve the dispersibility of the pigment, and remarkably improve the adaptability in use such as non-agglomeration property and fluidity, as well as clarity of tone and gloss of the coating article.

TABLE 1

Aqueous Type Pigment Dispersing Agent (Urethanic)

| Compound (Pigment dispersing Agent) | Polymer Portion | | | Organic Dyestuff |
|---|---|---|---|---|
| | Terminal | Skeleton | Mn | |
| 1 | —NH$_2$ | Urethane | 21000 | CuPc—COOH |
| 2 | —NCO | ↑ | 7000 | CuPc—CH$_2$NH$_2$ |
| 3 | —NCO | ↑ | 22000 | CuPc—OH |
| 4 | —NH$_2$ | ↑ | 21000 | QRN—COOH |
| 5 | —NH$_2$ | ↑ | ↑ | Dioxadine-COOH |
| 6 | —NCO | ↑ | 7000 | QRN—OH |
| 7 | —NH$_2$ | ↑ | 21000 | Dis-azo-COOH |

TABLE 1-continued

Aqueous Type Pigment Dispersing Agent (Urethanic)

| Compound (Pigment dispersing Agent) | Polymer Portion | | | Organic Dyestuff |
|---|---|---|---|---|
| | Terminal | Skeleton | Mn | |
| 8 | —OH | ↑ | 6000 | CuPc—COOH |
| 9 | —NH$_2$ | ↑ | 10000 | CuPc—SO$_2$Cl |
| 10 | —NH$_2$ | ↑ | 20000 | CuPc—COCl |
| 11 | —NH$_2$ | ↑ | 10000 | QRN—SO$_2$Cl |
| 12 | —NH$_2$ | ↑ | 20000 | Dioxadine-SO$_2$Cl |
| 13 | —NH$_2$ | ↑ | 10000 | Dis-azo-SO$_2$Cl |
| 14 | —NH$_2$ | ↑ | 10000 | CuPc—CH$_2$Cl |
| 15 | —NH$_2$ | ↑ | 10000 | QRN—CH$_2$NHCOCH$_2$Cl |
| 16 | —NH$_2$ | ↑ | 10000 | AQN—COCl |
| 17 | —NH$_2$ | ↑ | 20000 | AQN—SO$_2$Cl |
| 18 | —NCO | ↑ | 7000 | AQN—NH$_2$ |
| 19 | —NH$_2$ | ↑ | 10000 | AQN—COOH |
| 20 | —NH$_2$ | ↑ | 20000 | Acridone-COCl |
| 21 | —NCO | ↑ | 7000 | Acridone-NH$_2$ |
| 22 | —NH$_2$ | ↑ | 10000 | Acridone-CH$_2$Cl |
| 23 | —NH$_2$ | ↑ | 20000 | AQN—CH$_2$NHCOCH$_2$Cl |
| 24 | —OH | ↑ | 6000 | AQN—COCl |

TABLE 2

Aqueous Type Pigment Dispersing Agent (Acrylic)

| Compound (Pigment dispersing Agent) | Polymer Portion | | | Organic Dyestuff |
|---|---|---|---|---|
| | Terminal | Skeleton | Mn | |
| 25 | —NH$_2$ | Acrylic | 8000 | CuPc—COCl |
| 26 | —NH$_2$ | ↑ | 25000 | CuPc—SO$_2$Cl |
| 27 | —NH$_2$ | ↑ | 8000 | QRN—COCl |
| 28 | —NH$_2$ | ↑ | 25000 | QRN—SO$_2$Cl |
| 29 | —NH$_2$ | ↑ | ↑ | Dioxadine-SO$_2$Cl |
| 30 | —NH$_2$ | ↑ | ↑ | Dis-azo-SO$_2$Cl |
| 31 | —NH$_2$ | ↑ | ↑ | CuPc—CH$_2$Cl |
| 32 | —NH$_2$ | ↑ | ↑ | CuPc—CH$_2$NHCOCH$_2$Cl |
| 33 | —NH$_2$ | ↑ | 8000 | AQN—COCl |
| 34 | —NH$_2$ | ↑ | 25000 | AQN—SO$_2$Cl |
| 35 | —NH$_2$ | ↑ | ↑ | Acridone-COCl |
| 36 | —NH$_2$ | ↑ | 8000 | Acridone-CH$_2$Cl |
| 37 | —NH$_2$ | ↑ | 25000 | AQN—CH$_2$NHCOCH$_2$Cl |
| 38 | — | ↑ | 9000 | QRN—SH |
| 39 | — | ↑ | 30000 | QRN—SH |
| 40 | — | ↑ | ↑ | CuPc—SH |
| 41 | — | ↑ | ↑ | Dioxadine-SH |
| 42 | — | ↑ | 9000 | AQN—SH |
| 43 | — | ↑ | 30000 | AQN—SH |
| 44 | — | ↑ | ↑ | Acridone-SH |

TABLE 3

Aqueous Pigment Dispersion Using Urethanic Aqueous Type Pigment

| | Pigment | Coating Composition | | | | | Gloss 20° G. (%) |
|---|---|---|---|---|---|---|---|
| | | Compound Number | Pigment | Compound | Resin Ac/Me | Solvent (water) | |
| | | Dispersing Agent (1) | | | | | |
| Comp. Ex 1 | C.I. Pigment Blue 15:1 | — | 5 | 0 | 14/6 | 75 | 34.0 |
| Example 1 | (Phthalocyanine | 1 | 5 | 1 | 13/6 | 75 | 77.5 |
| Example 2 | pigment) | 2 | 5 | 2 | 12/6 | 75 | 76.8 |
| Example 3 | | 3 | 5 | 3 | 11/6 | 75 | 75.0 |
| Example 4 | | 8 | 5 | 2 | 12/6 | 75 | 76.0 |

TABLE 3-continued

Aqueous Pigment Dispersion Using Urethanic Aqueous Type Pigment

| | | | Coating Composition | | | | Gloss |
|---|---|---|---|---|---|---|---|
| | Pigment | Compound Number | Pigment | Compound | Resin Ac/Me | Solvent (water) | 20° G. (%) |
| Example 5 | | 9 | 5 | 1 | 13/6 | 75 | 78.3 |
| Example 6 | | 10 | 5 | 2 | 12/6 | 75 | 75.2 |
| Example 7 | | 14 | 5 | 2 | 12/6 | 75 | 77.7 |
| Example 8 | | 17 | 5 | 2 | 12/6 | 75 | 73.5 |
| Example 9 | | 20 | 5 | 2 | 12/6 | 75 | 73.7 |
| Comp. Ex 2 | C.I. Pigment Violet 19 | — | 5 | 0 | 14/6 | 75 | 30.2 |
| Example 10 | (Quinacridone pigment) | 4 | 5 | 2 | 12/6 | 75 | 80.4 |
| Example 11 | | 6 | 5 | 2 | 12/6 | 75 | 77.3 |
| Example 12 | | 11 | 5 | 2 | 12/6 | 75 | 78.2 |
| Example 13 | | 15 | 5 | 2 | 12/6 | 75 | 77.5 |
| Example 14 | | 17 | 5 | 2 | 12/6 | 75 | 73.0 |
| Example 15 | | 20 | 5 | 2 | 12/6 | 75 | 73.2 |
| Comp. Ex 3 | C.I. Pigment Red 122 | — | 5 | 0 | 14/6 | 75 | 28.5 |
| Example 16 | (Quinacridone pigment) | 4 | 5 | 3 | 11/6 | 75 | 79.8 |
| Example 17 | | 6 | 5 | 3 | 11/6 | 75 | 76.6 |
| Example 18 | | 11 | 5 | 3 | 11/6 | 75 | 77.9 |
| Example 19 | | 15 | 5 | 2 | 12/6 | 75 | 77.2 |
| Example 20 | | 17 | 5 | 3 | 11/6 | 75 | 70.2 |
| Example 21 | | 20 | 5 | 3 | 11/6 | 75 | 69.6 |
| | | Dispersing Agent (2) | | | | | |
| Comp. Ex 4 | C.I. Pigment Red 177 | — | 5 | 0 | 14/6 | 75 | 42.9 |
| Example 22 | (Anthraquinone | 4 | 5 | 2 | 12/6 | 75 | 85.2 |
| Example 23 | pigment) | 11 | 5 | 2 | 12/6 | 75 | 88.2 |
| Example 24 | | 16 | 5 | 2 | 12/6 | 75 | 74.3 |
| Example 25 | | 17 | 5 | 3 | 11/6 | 75 | 76.0 |
| Example 26 | | 18 | 5 | 2 | 12/6 | 75 | 74.0 |
| Example 27 | | 19 | 5 | 2 | 12/6 | 75 | 74.1 |
| Example 28 | | 20 | 5 | 3 | 11/6 | 75 | 75.7 |
| Example 29 | | 21 | 5 | 2 | 12/6 | 75 | 74.3 |
| Example 30 | | 22 | 5 | 2 | 12/6 | 75 | 74.5 |
| Example 31 | | 23 | 5 | 2 | 12/6 | 75 | 75.0 |
| Example 32 | | 24 | 5 | 3 | 11/6 | 75 | 74.2 |
| Comp. Ex 5 | C.I. Pigment Violet 23 | — | 5 | 0 | 14/6 | 75 | 33.2 |
| Example 33 | (Dioxadine pigment) | 5 | 5 | 1 | 13/6 | 75 | 75.4 |
| Example 34 | | 12 | 5 | 1 | 13/6 | 75 | 77.2 |
| Example 35 | | 17 | 5 | 2 | 12/6 | 75 | 72.3 |
| Example 36 | | 20 | 5 | 2 | 12/6 | 75 | 71.8 |
| Comp. Ex 6 | C.I. Pigment Yellow 83 | — | 5 | 0 | 14/6 | 75 | 52.7 |
| Example 37 | (Dis-azo pigment) | 7 | 5 | 3 | 11/6 | 75 | 80.0 |
| Example 38 | | 13 | 5 | 3 | 11/6 | 75 | 82.1 |
| Example 39 | | 17 | 5 | 2 | 12/6 | 75 | 75.0 |
| Example 40 | | 20 | 5 | 2 | 12/6 | 75 | 75.2 |
| Comp. Ex 7 | C.I. Pigment Red 101 | — | 5 | 0 | 14/6 | 75 | 77.7 |
| Example 41 | (Inorganic pigment) | 4 | 5 | 3 | 11/6 | 75 | 90.4 |
| Example 42 | | 11 | 5 | 3 | 11/6 | 75 | 88.0 |
| Example 43 | | 17 | 5 | 3 | 11/6 | 75 | 90.4 |
| Example 44 | | 20 | 5 | 3 | 11/6 | 75 | 90.0 |
| Comp. Ex 8 | C.I. Pigment Yellow 101 | — | 5 | 0 | 11/6 | 75 | 60.5 |
| Example 45 | (Isoindolinone | 13 | 5 | 2 | 12/6 | 75 | 83.9 |
| Example 46 | pigment) | 17 | 5 | 2 | 12/6 | 75 | 82.5 |
| Example 47 | | 20 | 5 | 2 | 12/6 | 75 | 85.1 |

Coating composition: Resin Ac/Me --- Acryl/melamime
Gloss: Gloss value of 20° angle

TABLE 4

Aqueous Pigment Dispersion Using Acrylic Aqueous Type Pigment

| | | | Coating Composition | | | | Gloss |
|---|---|---|---|---|---|---|---|
| | Pigment | Compound Number | Pigment | Compound | Resin Ac/Me | Solvent (water) | 20° G. (%) |
| | | Dispersing Agent (1) | | | | | |
| Comp. Ex 1 | C.I. Pigment Blue 15:1 | — | 5 | 0 | 14/6 | 75 | 34.0 |
| Example 48 | (Phthalocyanme | 25 | 5 | 1 | 13/6 | 75 | 76.1 |
| Example 49 | pigment) | 26 | 5 | 2 | 12/6 | 75 | 77.2 |

TABLE 4-continued

Aqueous Pigment Dispersion Using Acrylic Aqueous Type Pigment

| | Pigment | Compound Number | Pigment | Compound | Coating Composition Resin Ac/Me | Solvent (water) | Gloss 20° G. (%) |
|---|---|---|---|---|---|---|---|
| Example 50 | | 31 | 5 | 2 | 12/6 | 75 | 76.5 |
| Example 51 | | 32 | 5 | 2 | 12/6 | 75 | 76.8 |
| Example 52 | | 33 | 5 | 2 | 12/6 | 75 | 73.2 |
| Example 53 | | 34 | 5 | 2 | 12/6 | 75 | 75.1 |
| Example 54 | | 35 | 5 | 2 | 12/6 | 75 | 72.7 |
| Example 55 | | 36 | 5 | 2 | 12/6 | 75 | 72.5 |
| Example 56 | | 37 | 5 | 2 | 12/6 | 75 | 74.0 |
| Example 57 | | 40 | 5 | 1 | 13/6 | 75 | 73.8 |
| Example 58 | | 42 | 5 | 1 | 13/6 | 75 | 72.6 |
| Example 59 | | 43 | 5 | 2 | 12/6 | 75 | 74.0 |
| Example 60 | | 44 | 5 | 2 | 12/6 | 75 | 71.9 |
| Comp. Ex 2 | C.I. Pigment Violet 19 | — | 5 | 0 | 14/6 | 75 | 30.2 |
| Example 61 | (Quinacridone pigment) | 27 | 5 | 2 | 12/6 | 75 | 79.2 |
| Example 62 | | 28 | 5 | 2 | 12/6 | 75 | 78.3 |
| Example 63 | | 34 | 5 | 2 | 12/6 | 75 | 72.9 |
| Example 64 | | 35 | 5 | 2 | 12/6 | 75 | 73.3 |
| Example 65 | | 38 | 5 | 2 | 12/6 | 75 | 75.6 |
| Example 66 | | 39 | 5 | 2 | 12/6 | 75 | 77.2 |
| Example 67 | | 43 | 5 | 2 | 12/6 | 75 | 73.2 |
| Example 68 | | 44 | 5 | 2 | 12/6 | 75 | 74.9 |
| Comp. Ex 3 | C.I. Pigment Red 122 | — | 5 | 0 | 14/6 | 75 | 28.5 |
| Example 69 | (Quinacridone pigment) | 27 | 5 | 3 | 11/6 | 75 | 75.9 |
| Example 70 | | 28 | 5 | 3 | 11/6 | 75 | 73.2 |
| Example 71 | | 34 | 5 | 3 | 11/6 | 75 | 71.2 |
| Example 72 | | 38 | 5 | 3 | 11/6 | 75 | 71.9 |
| Example 73 | | 39 | 5 | 2 | 12/6 | 75 | 73.2 |
| Example 74 | | 43 | 5 | 3 | 11/6 | 75 | 69.2 |
| | | Dispersing Agent (2) | | | | | |
| Comp. Ex 4 | C.I Pigment Red 177 | — | 5 | 0 | 14/6 | 75 | 42.9 |
| Example 75 | (Anthraquinone | 28 | 5 | 2 | 12/6 | 75 | 88.1 |
| Example 76 | pigment) | 34 | 5 | 2 | 12/6 | 75 | 73.4 |
| Example 77 | | 35 | 5 | 3 | 11/6 | 75 | 72.5 |
| Example 78 | | 39 | 5 | 2 | 12/6 | 75 | 87.1 |
| Example 79 | | 42 | 5 | 2 | 12/6 | 75 | 76.2 |
| Example 80 | | 43 | 5 | 3 | 11/6 | 75 | 75.3 |
| Comp. Ex 5 | C.I. Pigment Violet 23 | — | 5 | 0 | 14/6 | 75 | 33.2 |
| Example 81 | (Dioxadine pigment) | 29 | 5 | 1 | 13/6 | 75 | 75.7 |
| Example 82 | | 34 | 5 | 3 | 11/6 | 75 | 72.5 |
| Example 83 | | 41 | 5 | 2 | 12/6 | 75 | 74.3 |
| Example 84 | | 43 | 5 | 2 | 12/6 | 75 | 72.9 |
| Comp. Ex 6 | C.I. Pigment Yellow 83 | — | 5 | 0 | 14/6 | 75 | 52.7 |
| Example 85 | (Dis-azo pigment) | 30 | 5 | 3 | 11/6 | 75 | 81.1 |
| Comp. Ex 7 | C.I. Pigment Red 101 | — | 5 | 0 | 14/6 | 75 | 77.7 |
| Example 86 | (Inorganic pigment) | 27 | 5 | 3 | 11/6 | 75 | 93.1 |
| Example 87 | | 34 | 5 | 3 | 11/6 | 75 | 93.2 |
| Example 88 | | 39 | 5 | 3 | 11/6 | 75 | 90.9 |
| Example 89 | | 43 | 5 | 3 | 11/6 | 75 | 91.2 |
| Comp. Ex 8 | C.I. Pigment Yellow 110 | — | 5 | 0 | 14/6 | 75 | 60.5 |
| Example 90 | (Isoindolinone pigment) | 30 | 5 | 2 | 12/6 | 75 | 83.0 |

Coating composition: Resin Ac/Me --- Acryl/melamime
Gloss: Gloss value of 20° angle

What is claimed is:

1. A pigment-dispersing agent for dispersing pigment in an aqueous medium, wherein said pigment-dispersing agent has a structure in which at least one member selected from the group consisting of an organic dye, anthraquinone and acridone is bound to a linear acrylic polymer having two terminal ends at one or both of said terminal ends by at least one reactive group on said member selected from the group consisting of —COCl, —SO$_2$Cl, —CH$_2$Cl, and —CH$_2$NHCOCH$_2$Cl, wherein the linear acrylic polymer has a primary amino group or a secondary amino group.

2. A pigment dispersing agent as defined in claim 1, wherein the linear acrylic polymer is a linear acrylic polymer formed by polymerizing a monomer having a radical polymerizable unsaturated bond by using a chain transfer agent having a primary amino group and/or a secondary amino group.

3. A pigment composition comprising a pigment and a pigment-dispersing agent for dispersing a pigment in an aqueous medium, wherein said pigment-dispersing agent has a structure in which at least one member selected from the group consisting of an organic dye, anthraquinone and acridone is bound to a linear acrylic polymer having two terminal ends at one or both of said terminal ends by at least one reactive group on said member selected from the group consisting of —COCl, —SO$_2$Cl, —CH$_2$Cl and —CH$_2$NHCOCH$_2$Cl, wherein the linear acrylic polymer has a primary amino group or a secondary amino group.

4. A pigment composition as defined in claim 3 comprising an aqueous pigment dispersing agent, in which the linear acrylic polymer is a linear acrylic polymer formed by polymerizing a monomer having a radical polymerizable unsaturated bond by using a chain transfer agent having a primary amino group and/or a secondary amino group, and a pigment.

5. An aqueous pigment dispersion comprising a water dispersible or water soluble polymer, a pigment, and a pigment-dispersing agent for dispersing a pigment in an aqueous medium, wherein said pigment-dispersing agent has a structure in which at least one member selected from the group consisting of an organic dye, anthraquinone and acridone is bound to a linear acrylic polymer having two terminal ends at one or both of said terminal ends by at least one reactive group on said member selected from the group consisting of —COCl, —SO$_2$Cl, —CH$_2$Cl, and —CH$_2$NHCOCH$_2$Cl, wherein the linear acrylic polymer has a primary amino group or a secondary amino group.

6. An aqueous pigment dispersion as defined in claim 5 comprising an aqueous pigment dispersing agent, in which the linear acrylic polymer is a linear acrylic polymer formed by polymerizing a monomer having a radical polymerizable unsaturated bond by using a chain transfer agent having a primary amino group and/or a secondary amino group, a pigment and an aqueous resin.

7. A pigment composition according to claim 3, wherein the pigment is at least one pigment selected from the group consisting of a phthalocyanine pigment, a quinacridone pigment, an anthraquinone pigment, a dioxazine, a dis-azo pigment, and an inorganic pigment.

8. An aqueous pigment dispersion according to claim 5, wherein the pigment is at least one pigment selected from the group consisting of a phthalocyanine pigment, a quinacridone pigment, an anthraquinone pigment, a dioxazine, a dis-azo pigment, and an inorganic pigment.

9. An aqueous pigment dispersion according to claim 5, wherein the water dispersible or water soluble polymer is at least one resin selected from the group consisting of acrylic copolymers and styrene-acrylic acid copolymers.

10. An aqueous pigment dispersion according to claim 5, wherein the pigment is at least one pigment selected from the group consisting of a phthalocyanine pigment, a quinacridone pigment, an anthraquinone pigment, a dioxazine, a dis-azo pigment, and an inorganic pigment, and the water dispersible or water soluble polymer is at least one resin selected from the group consisting of acrylic copolymers and styrene-acrylic acid copolymers.

11. A method for making a pigment-dispersing agent for dispersing a pigment in an aqueous medium, comprising the steps of:

polymerizing monomers having radical polymerizable unsaturated bonds, in the presence of a chain transfer agent having at least either a primary amino group or a secondary amino group, to obtain a linear acrylic polymer having a primary amino group or a secondary amino group at a terminal end or at both terminal ends thereof; and reacting the linear acrylic polymer with an organic dye, anthraquinone or acridone having at least one reactive group selected from the group consisting of —COCl, —SO$_2$Cl, —CH$_2$Cl, and —CH$_2$NHCOCH$_2$Cl.

* * * * *